(12) United States Patent
Diaz

(10) Patent No.: US 9,469,321 B2
(45) Date of Patent: Oct. 18, 2016

(54) MOBILE CART WITH RETRACTABLE WHEEL ASSEMBLY

(71) Applicant: Jose Mario Diaz, Goodyear, AZ (US)

(72) Inventor: Jose Mario Diaz, Goodyear, AZ (US)

(73) Assignee: CONTRIVANCE INC., Phoenix, AZ (US)

( * ) Notice: Subject to any disclaimer, the term of this patent is extended or adjusted under 35 U.S.C. 154(b) by 48 days.

(21) Appl. No.: 14/576,621

(22) Filed: Dec. 19, 2014

(65) Prior Publication Data

US 2016/0176426 A1 Jun. 23, 2016

(51) Int. Cl.
*B62B 3/02* (2006.01)

(52) U.S. Cl.
CPC ...................... *B62B 3/02* (2013.01)

(58) Field of Classification Search
CPC ............... B62B 3/02; B62B 2205/14; B62B 2205/145; B60B 33/06; B60B 33/063; B60B 33/066
See application file for complete search history.

(56) References Cited

U.S. PATENT DOCUMENTS

| | | | | | |
|---|---|---|---|---|---|
| 2,592,166 | A | * | 4/1952 | McLean | A61G 7/012 280/43.21 |
| 3,544,127 | A | * | 12/1970 | Dobson | B60S 9/14 280/43.17 |
| 3,635,491 | A | * | 1/1972 | Drews | B60B 33/06 280/43.14 |
| RE30,191 | E | * | 1/1980 | Mautz | B60P 7/13 280/43.23 |
| 4,274,644 | A | * | 6/1981 | Taylor | B62B 3/02 280/39 |
| 4,905,463 | A | * | 3/1990 | Eilles | A01D 34/74 280/43.13 |
| 5,403,022 | A | * | 4/1995 | Snider | B60N 2/2848 280/30 |
| 5,628,522 | A | * | 5/1997 | Hall | B60B 33/06 280/43.14 |
| 5,778,488 | A | * | 7/1998 | Tsai | A45C 5/146 16/34 |
| 5,845,363 | A | * | 12/1998 | Brempell | E05D 15/0669 16/105 |
| 6,240,579 | B1 | * | 6/2001 | Hanson | A61G 7/012 280/43.17 |
| 6,575,491 | B2 | * | 6/2003 | Miller | B62B 3/027 280/43.17 |
| 7,537,222 | B2 | * | 5/2009 | Hadar | B62B 5/049 280/43.12 |
| 7,547,025 | B2 | * | 6/2009 | Coates | B60P 1/027 280/43.2 |
| 7,717,440 | B1 | * | 5/2010 | Baba | B62B 1/002 280/43 |
| 8,016,300 | B2 | * | 9/2011 | Cramer | B62B 5/049 137/899.3 |
| 2004/0004332 | A1 | * | 1/2004 | Tsai | A45C 5/146 280/43.1 |

* cited by examiner

*Primary Examiner* — Katy M Ebner
(74) *Attorney, Agent, or Firm* — Weiss & Moy, P.C.; Jeffrey D. Moy

(57) ABSTRACT

A mobile cart having a retractable wheel assembly. A control rod engages the gear mechanisms coupled to the deployment rods. As the control rod engages the gear mechanisms, the gear mechanisms rotate the deployment rods between a deployed state and a retracted state. The ends of the deployment rods that are located within each wheel base push against the top portion of each wheel housing, thereby pushing each wheel housing out and away from the wheel bases so that the mobile cart may be pushed on the exposed wheels.

16 Claims, 4 Drawing Sheets

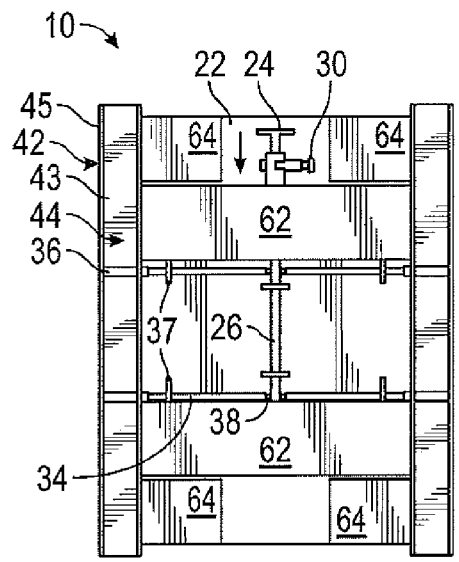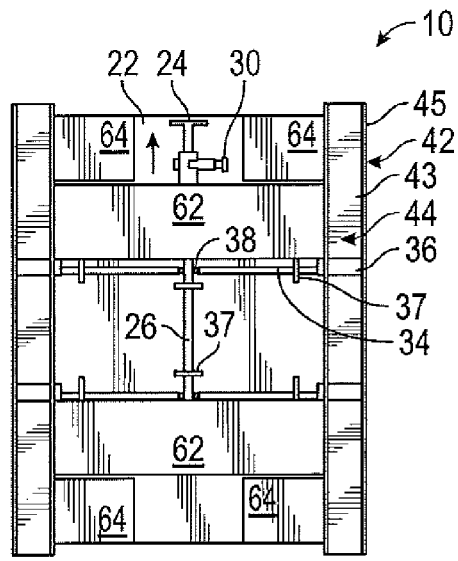
FIG. 3A  FIG. 3B
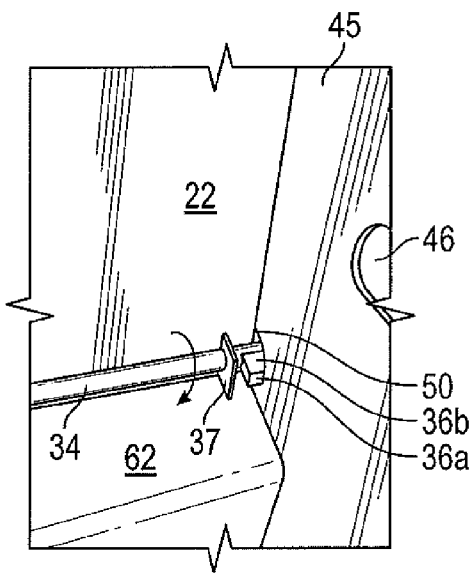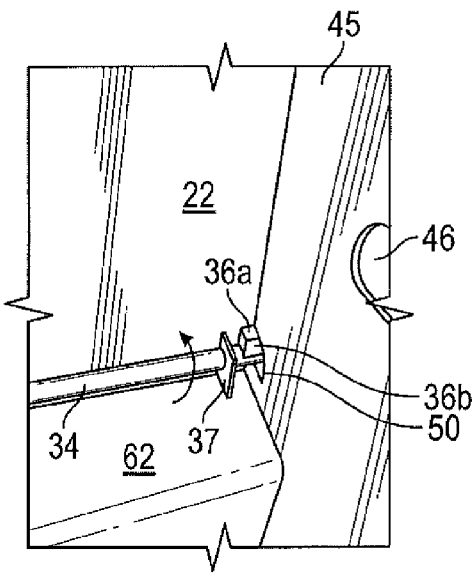
FIG. 4A  FIG. 4B

MOBILE CART WITH RETRACTABLE WHEEL ASSEMBLY

TECHNICAL FIELD

The present invention in general relates to mobile carts, and more specifically, to a mobile cart with a retractable wheel assembly.

BACKGROUND

Mobile carts may be used to transport heavy items, such as high pressure cylinders or liquid gas canisters. Some mobile carts have wheels for easy transport, but the wheels are always deployed. This may lead to instability, since the cart can always roll. Other mobile carts may have retractable wheels. But in order to secure the wheels in a retracted or deployed position, securing pins must be manually positioned and secured within securing pin holes. The process of manually removing or replacing the securing pins within the securing pin holes may be extremely time consuming. Furthermore, if the securing pins are misplaced, then the wheels may not be held properly in place. It would thus be desirable to provide a mobile cart with a retractable wheel assembly that did not require the use of securing pins and that allowed for quick deployment and retraction of the wheels.

SUMMARY

In accordance with one embodiment of the present invention, a mobile cart is disclosed. The mobile cart comprises: a frame; at least one retractable wheel base assembly coupled to a base of the frame, wherein the retractable wheel base assembly comprises: a wheel base; a wheel housing movably coupled to the wheel base; and a plurality of wheels coupled within the wheel housing; and a gear mechanism for deploying and retracting the wheel housing relative to the wheel base.

In accordance with another embodiment of the present invention, a mobile cart is disclosed. The mobile cart comprises: a frame; two retractable wheel base assemblies coupled to opposing sides of a base of the frame, wherein each retractable wheel base assembly comprises: a wheel base having an elongated channel; a wheel housing movably coupled to the wheel base within the channel; and a plurality of wheels coupled in line within the wheel housing; at least two deployment rods coupled to the base of the frame, each end of each deployment rod being positioned within one of the wheel bases; a control rod coupled to the frame; and a gear mechanism coupled along a length of each deployment rod, wherein the control rod has a plurality of teeth that engage the gear mechanism of each deployment rod to move the deployment rods between a deployed position and a retracted position.

In accordance with another embodiment of the present invention, a mobile cart is disclosed. The mobile cart comprises: a frame; two retractable wheel base assemblies coupled to opposing sides of a base of the frame, wherein each retractable wheel base assembly comprises: a wheel base having an elongated channel; a wheel housing movably coupled to the wheel base within the channel; three wheels coupled in line within the wheel housing; and a wheel brake coupled to a center wheel; two deployment rods coupled to the base of the frame, each end of the deployment rods being positioned within one of the wheel bases; a control rod coupled to the frame; and two gear mechanisms, each coupled to a center portion of the length of each of the two deployment rods, wherein the control rod has a plurality of teeth that engage the gear mechanisms to move the deployment rods between a deployed position and a retracted position.

BRIEF DESCRIPTION OF THE DRAWINGS

The present application is further detailed with respect to the following drawings. These figures are not intended to limit the scope of the present application, but rather, illustrate certain attributes thereof.

FIG. 3A is a bottom view of the mobile cart of FIG. 1 shown with the handle being pushed in to deploy the wheel housings;

FIG. 3B is a bottom view of the mobile cart of FIG. 1 shown with the handle being pulled out to retract the wheel housings;

FIG. 4A is an elevated perspective view of a deployment rod of the mobile cart of FIG. 1 being rotated into a deployed position when the handle is pushed in;

FIG. 4B is an elevated perspective view of a deployment rod of the mobile cart of FIG. 1 being rotated back into a retracted position when the handle is pulled out;

DESCRIPTION OF THE INVENTION

The description set forth below in connection with the appended drawings is intended as a description of presently preferred embodiments of the disclosure and is not intended to represent the only forms in which the present disclosure may be constructed and/or utilized. The description sets forth the functions and the sequence of steps for constructing and operating the disclosure in connection with the illustrated embodiments. It is to be understood, however, that the same or equivalent functions and sequences may be accomplished by different embodiments that are also intended to be encompassed within the spirit and scope of this disclosure.

FIGS. 1-7 together show an exemplary mobile cart 10 in accordance with one or more aspects of the present invention. The mobile cart 10, in its simplest form, may comprise a frame 12 and at least one retractable wheel base assembly 40.

Figure 1:
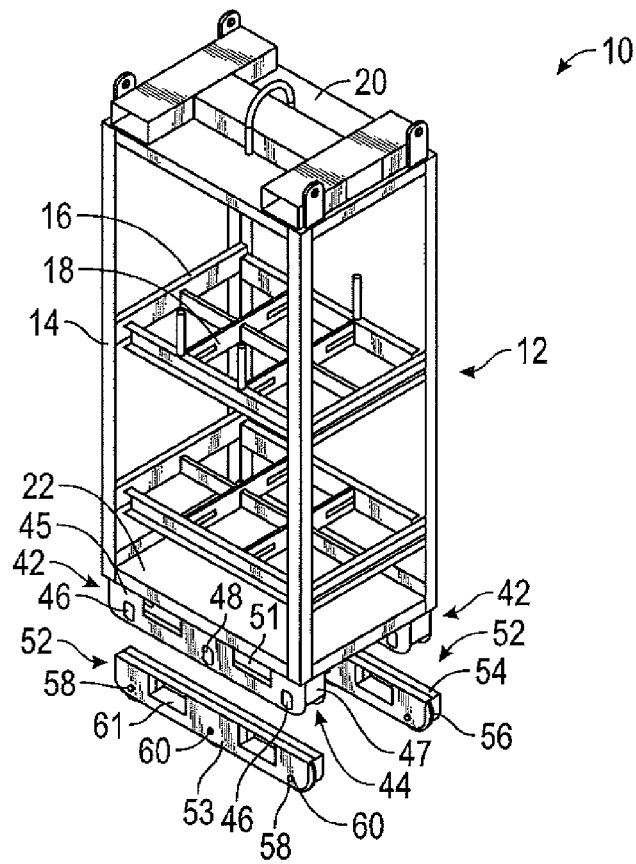
FIG. 1 is an elevated perspective view of an exemplary mobile cart with retractable wheel assembly in accordance with one or more aspects of the present invention.
Figure 2:
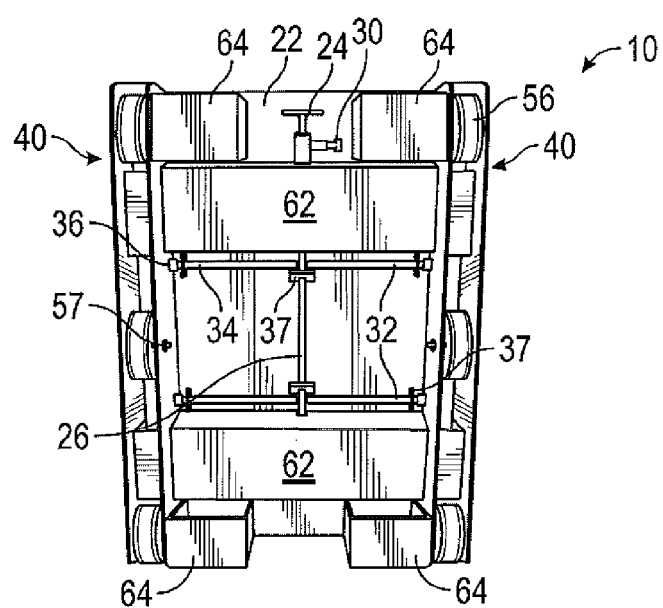
FIG. 2 is a bottom perspective view of the mobile cart of FIG. 1.

Referring to FIGS. 1-2, the frame 12 may be any type of frame 12 used to transport any type of products. For example, the mobile cart 10 may be used to transport high pressure cylinders or liquid gas canisters. As shown in FIG. 1, the frame 12 of the mobile cart 10 may have a top 20, a base 22, a plurality of vertical supports 14 and a plurality of horizontal supports 16 to establish the general shape of the frame 12. The vertical supports 14 may be coupled to and extending between the top 20 and the base 22 of the frame 12. The frame 12 may also have spacers 18 that are coupled to the horizontal supports 16 and that traverse the middle of the frame 12 thereby creating defined spaces for each of the items being transported. This may help to prevent the items from moving and hitting each other during transport. It should be clearly understood that substantial benefit may still be derived without the use of spacers 18.

The frame 12 may also have a pair of large forklift channels 62 formed on a bottom surface of the base 22 of the frame 12. The forks of a forklift may be inserted through the large forklift channels 62 so that the mobile cart 10 may be lifted by the forklift. The large forklift channels 62 may traverse across the middle of the base 22 of the frame 12. The base 22 may also have two pairs of small forklift channels 64, one pair of small forklift channels 64 formed on one end of the bottom of the base 22 and another pair of corresponding small forklift channels 64 formed on the opposite end of the bottom of the base 22. The small forklift channels 64 may not traverse across the middle of the base 22, but the small forklift channels 64 may be positioned perpendicular to the large forklift channels 62. The forks of a forklift may be inserted through the first pair of small forklift channels 64 formed on one side of the bottom of the base 22, traverse the width of the base 22 beneath the large forklift channels 62, and then be inserted through the second pair of small forklift channels 64 formed on the opposite side of the bottom of the base 22.

The frame 12 may also have a wheel base assembly 40 coupled to the base 22 of the frame 12. As shown in FIGS. 1-2, the mobile cart 10 may have two wheel base assemblies 40 coupled on opposing sides of the base 22, but it should be clearly understood that substantial benefit may still be derived if the mobile cart 10 of the present invention had one or more wheel base assemblies 40 coupled to the base 22 of the frame 12. Each wheel base assembly 40 may comprise a wheel base 42 and wheel housing 52. The wheel base 42 forms an elongated channel 44 (see FIGS. 3A, 3B, and 5) therein that is adapted to receive a wheel housing 52.

Each wheel housing 52 may have a top portion 54 and two long side walls 53 that extend downwardly and perpendicularly from the top portion 54. As shown in FIG. 2, each wheel housing 52 may have three wheels 56 coupled in line therein. It should be clearly understood that any suitable number of wheels 56 may be used. Referring to FIG. 1, the wheel housing 52 may have three pairs of openings 60 (one pair of openings 60 for each wheel 56) formed within the two side walls 53, wherein each of the three openings 60 of one side wall 53 align with its corresponding opening 60 on the other side wall 53. Each pair of openings 60 may be adapted to receive one end of a wheel axel 57 and/or a bolt 58 or other securing mechanism. The ends of the wheel axels 57 may be threaded so that bolts 58 or other securing mechanisms may be used to secure the ends of the wheel axels 57 to the wheel housing 52.

The mobile cart 10 may have one or more deployment rods 32 coupled to the bottom surface of the base 22 of the frame 12. Referring to FIGS. 3A-4B, the mobile cart 10 may have two deployment rods 32 that may be positioned parallel to the forklift channels 62 and may be positioned perpendicular to the wheel base assemblies 40. Each deployment rod 32 may have an elongated body 34 that traverses across the middle of the frame 12 and have two ends 36, wherein each end 36 is located within the channel 44 of one of the wheel bases 42. Each deployment rod 32 may be movably coupled to the bottom surface of the base 22 by one or more U-shaped plates 37, wherein at least one U-shaped plate 37 may be positioned proximate each end 36 of the deployment rod 32. The side wall 45 of each wheel base 42 that is positioned more medially than the other side wall 45 may have a deployment rod opening 50. The deployment rod opening 50 may be adapted to accommodate the elongated body 34 and/or the rectangular end 36 of a deployment rod 32 and to allow for movement of the elongated body 34 and/or the rectangular end 36 between the deployed and retracted positions. In one embodiment, the elongated body 34 may have a cylindrical shape and the two ends 36 may have a rectangular shape.

Each deployment rod 32 alternates between a deployed position and a retracted position. In the retracted position, the rectangular ends 36 are positioned so that the wide surfaces 36b of the rectangular ends 36 are flat/flush against a bottom surface of the top portion 43 of the wheel base 42 and against the top surface of the top portion 54 of the wheel housing 52. When the deployment rods 32 are switched to the deployed position, each elongated body 34 rotates until the narrow surfaces 36a of each rectangular end 36 are flat/flush against the bottom surface of the top portion 43 of the wheel base 42 and against the top surface of the top portion 54 of the wheel housing 52. By switching the orientation of the rectangular ends 36 of the deployment rods 32 to the deployed position, the rectangular ends 36 push against the top surface of the top portion 54 of the wheel housing 52, thus pushing the wheel housing 52 downwardly and outwardly from the channel 44 of the wheel base 42. The wheels 56 in the wheel housing 52 now stick out further than the wheel base 42 so that the mobile cart 10 may be pushed around on its wheels 56. When the deployment rods 32 are switched back to a retracted position, each elongated body 34 rotates until the wide surface 36b of each rectangular end 36 is once again flat and flush against the bottom surface of the top portion 43 of the wheel base 42. By switching the orientation of the rectangular ends 36 of the deployment rods 32 to the retracted position, the rectangular ends 36 no longer push the wheel housing 52 downwardly or out from the wheel base 42. The wheels 56 no longer stick out further than the wheel base 42. Therefore, the mobile cart 10 cannot be pushed around on its wheels 56 and the wheel base 42 (and possibly the small forklift channels 64) would directly contact the floor.

Figure 5:
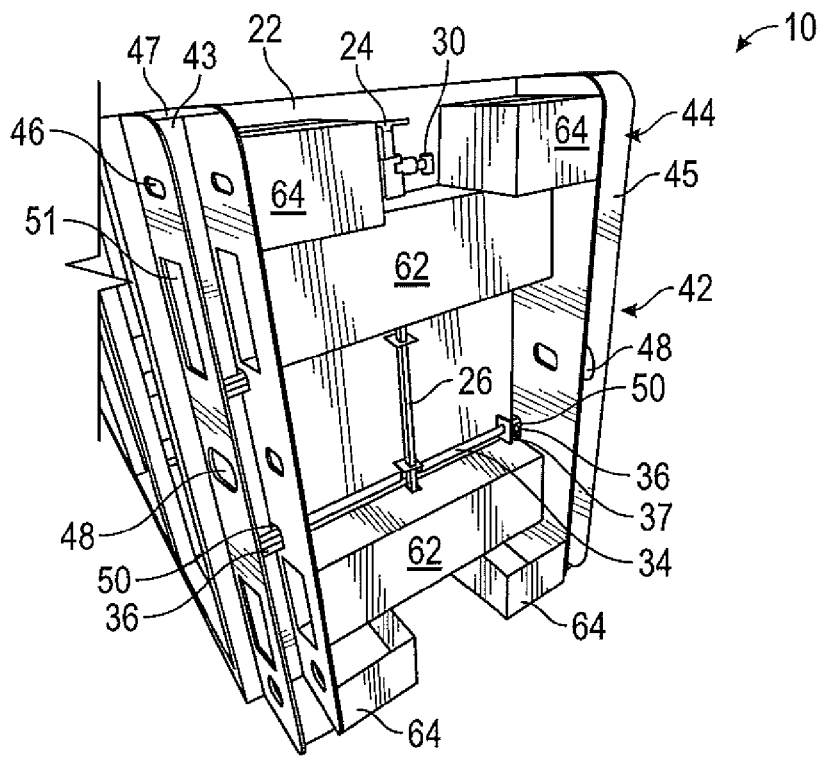
FIG. 5 is a bottom perspective view of the mobile cart of FIG. 1 shown with the wheel housings removed from the wheel bases.

Referring to FIG. 5, each wheel base 42 may be coupled to the bottom surface of the base 22 of the frame 12. The elongated channel 44 may be defined by a top portion 43 that is coupled to the bottom surface of the base 22 of the frame 12, two long side walls 45 extending downwardly and perpendicularly from the top portion 43, and at least one short end wall 47 that also extends downwardly and perpendicularly from the top portion 43 and that also joins the two long side walls 45 together at one end. In one embodiment, the elongated channel 44 may be defined by two long side walls 45 and two short end walls 47 that join the two long side walls 45 together at both ends, fully enclosing a perimeter of the channel 44. The side walls 45 may each have two forklift openings 51 formed therethrough which are adapted to align with the forklift channels 62. In the exemplary mobile cart 10 shown herein, there may be one wheel base 42 coupled to the bottom surface of the base 22 and positioned at one end of the forklift channel 62 and there may be another wheel base 42 coupled to the bottom surface of the base 22 and positioned at the other end of the forklift channel 62. Therefore, the fork of a forklift may pass through the forklift openings 51 of the two long side walls 45 of one wheel base 42, through the forklift channels 62, through the forklift openings 51 of the two long side walls 45 of the other wheel base 42.

The side walls 45 of each wheel base 42 may also have elongated vertical openings 46 for receiving the bolts 58 (or other securing mechanisms) that are used to secure the ends of the wheel axels 57 to the wheel housings 52. As the wheel housing 52 switches from a deployed position to a retracted position and vice versa, the bolts 58 and the ends of the wheel axels 57 may move up and down freely within the elongated vertical openings 46. The side walls 45 of each wheel base 42 may also have an elongated brake opening 48 for receiving a wheel brake 59 (see FIG. 6), the wheel axel 57, and the bolt 28 that secures the wheel axel 57, the wheel 56, and the wheel brake 59 to the wheel housing 52. As the wheel housing 52 switches from a deployed position to a retracted position and vice versa, the bolts 58 (or other securing mechanisms), the wheel axel 57, and the wheel brake 59 may move up and down freely within the elongated brake opening 48.

Figure 6:
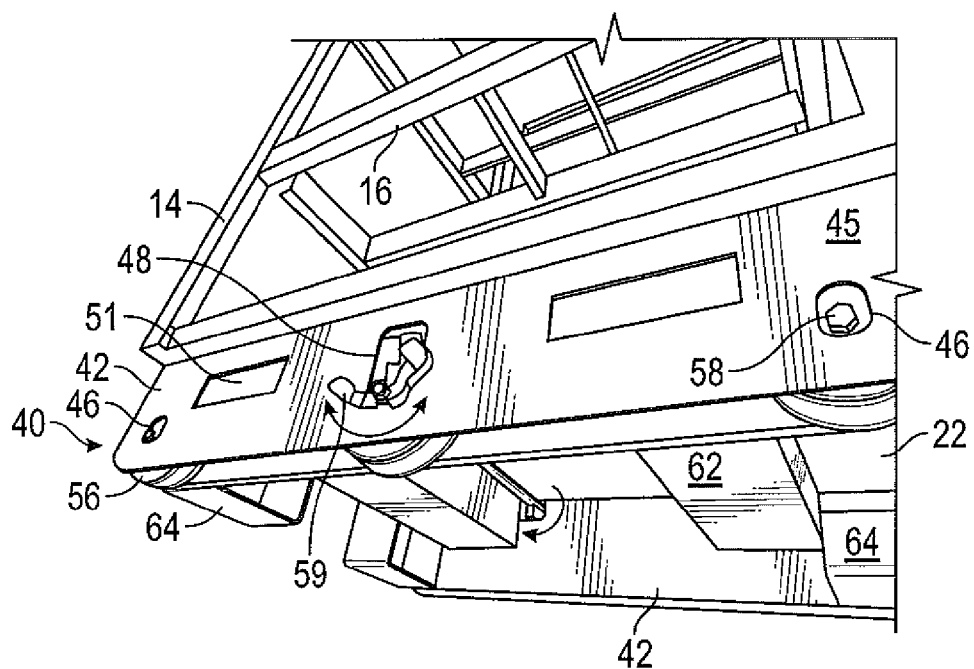
FIG. 6 is a perspective view of a wheel base assembly of the mobile cart of FIG. 1 showing the wheel brake moving between ON and OFF positions.

At least one side wall 53 of the wheel housing 52 may have an opening 60 that is adapted to receive a wheel brake 59 therethrough. Referring to FIG. 6, the wheel brake 59 may be coupled to the center wheel 56, but the wheel brake 59 may be coupled to any of the wheels 56. There may also be substantial benefit to having a wheel brake 59 on more than one or all of the wheels 56 within each wheel housing 52. In the embodiment shown in FIG. 6, the elongated brake opening 48 is shown located in the center of the wheel base 42 because the center wheel 56 in the wheel housing 52 is the only wheel 56 equipped with a wheel brake 59. Ideally, for any wheel 56 having a wheel brake 59, a corresponding elongated brake opening 48 would be present in the wheel base 42 to accommodate the wheel brake 59. When a user wishes to engage the wheel brake 59, the brake lever may be pushed in one direction, thereby shifting the wheel brake 59 to engage the wheel 56 and stop the wheel from rotating. When a user wishes to disengage the wheel brake 59, the brake lever may be pushed in the opposite direction, thereby disengaging the wheel 56. The opening 60 within the wheel housing 52 and the elongated brake opening 48 within the wheel base 42 are aligned and together allow the wheel brake 59 to move back and forth to engage and disengage the wheel 56. Each wheel housing 52 may also define two forklift channels 61 formed therethrough which are adapted to align with the two forklift openings 51 of each of the two wheel bases 42 and align with the two forklift channels 62 formed on the bottom surface of the base 22 of the frame 12. Therefore, when the two wheel housings 52 are positioned within the two wheel bases 42, the fork of a forklift may pass through the forklift openings 51 of the two long side walls 45 of one wheel base 42, through the forklift channels 61 of one wheel housing 52, through the forklift channels 62, through the forklift openings 51 of the two long side walls 45 of the other wheel base 42 and the forklift channels 61 of the other wheel housing 52 coupled at the opposite side of the forklift channel 62

Figure 7:
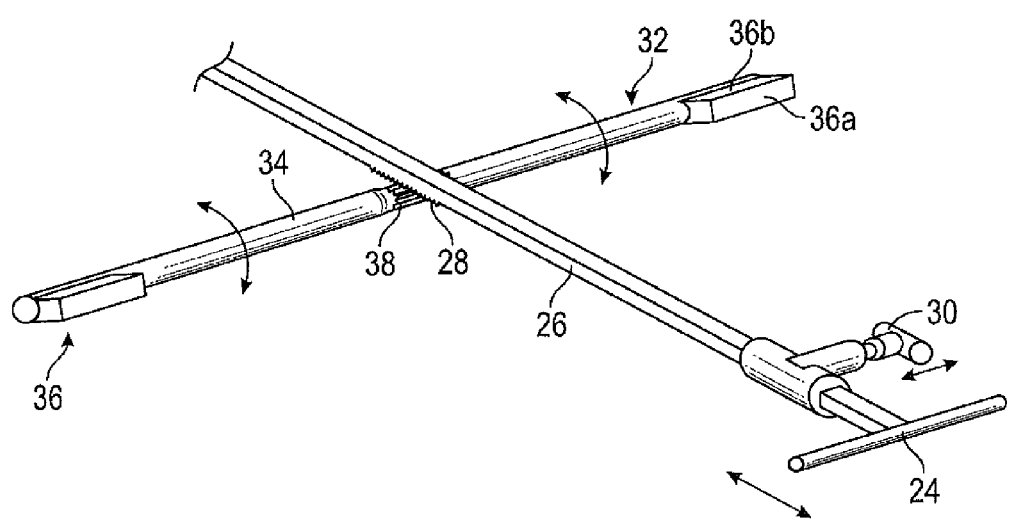
FIG. 7 is a partial perspective view of a portion of the control rod engaging the gear mechanism coupled to one of the deployment rods of the mobile cart of FIG. 1.

Referring to FIG. 7, the mobile cart 10 may have at least one gear mechanism 38 that is used to deploy and retract a wheel housing 52 in relation to its wheel base 42. As shown, a gear mechanism 38 may be coupled to a portion of the elongated body 34 of each deployment rod 32. The gear mechanism 38 may be coupled to a middle portion of each of the deployment rods 32. The mobile cart 10 may also have a control rod 26 that may be used to control the gear mechanism 38; i.e. rotate the gear mechanism 38 in order to deploy or retract the wheel housings 52 with respect to the wheel bases 42. The control rod 26 may be movably coupled to the bottom surface of the base 22 by one or more U-shaped plates 37. The control rod 26 may be positioned parallel to the wheel base assemblies 40 and perpendicular to the deployment rods 32. The control rod 26 may have a plurality of teeth 28 on at least one side. The teeth 28 may be formed on the top side of the control rod 26. The teeth 28 may be shaped to engage the gear mechanism 38 coupled to the elongated body 34 of the deployment rods 32. The control rod 26 may also have a handle 24 for a user to grip in order to move the control rod 26. For example, as the control rod 26 is moved in one direction (e.g. pushed in), the teeth 28 of the control rod 26 may engage the gear mechanisms 38 of each of the deployment rods 32 thereby causing the deployment rods 32 to rotate until the narrow surface 36a of each rectangular end 36 is flat and flush against the bottom surface of the top portion 43 of each wheel base 42 thereby pushing the wheel housings 52 downwardly and outwardly from the wheel bases 42 (deployed position). By moving the control rod 26 in the opposite direction (e.g. pulled out), the teeth 28 of the control rod 26 may again engage the gear mechanisms 38 of each of the deployment rods 32 thereby causing the deployment rods 32 to rotate in the opposite direction until the wide surface 36b of each rectangular end 36 is flat and flush against the bottom surface of the top portion 43 of each wheel base 42 allowing the wheel housings 52 to retract back into the wheel bases 42. The control rod 26 may move the deployment rods 32 simultaneously. However it should be clearly understood that substantial benefit may still be derived from the deployment rod 32 being controlled one-at-a-time. For safety purposes the control rod 26 may also have a lock 30 that prevents the handle 24 from being pushed in or pulled out, thereby preventing the control rod 26 from moving to deploy or retract the wheel housings 52 from the wheel bases 42.

The foregoing description is illustrative of particular embodiments of the application, but is not meant to be a limitation upon the practice thereof. The following claims, including all equivalents thereof, are intended to define the scope of the application.

What is claimed is:

1. A mobile cart comprising:
   a frame;
   at least one retractable wheel base assembly coupled to a base of the frame, wherein the retractable wheel base assembly comprises:
   a wheel base;
   a wheel housing movably coupled to the wheel base; and
   a plurality of wheels coupled within the wheel housing;
   a gear mechanism for deploying and retracting the wheel housing relative to the wheel base;
   at least one deployment rod coupled to the base of the frame, wherein the gear mechanism is coupled along a length of the deployment rod, wherein the deployment rod comprises:
   an elongated body; and
   at least one rectangular end coupled to the elongated body and positioned within the wheel base;
   wherein the deployment rod is in a retracted position when a wide surface of the rectangular end is positioned flat against a top portion of the wheel housing;
   wherein the deployment rod is in a deployed position when a narrow surface of the rectangular end is positioned flat against a top portion of the wheel housing; and
   a control rod coupled to the frame, wherein the control rod has a plurality of teeth that engage the near mechanism to move the deployment rod between a deployed position and a retracted position.

2. The mobile cart of claim 1 further comprising:
a handle coupled at one end of the control rod for manually moving the control rod; and
a lock for preventing movement of the handle.

3. The mobile cart of claim 1 further comprising a wheel brake coupled to at least of the wheels within the wheel housing.

4. The mobile cart of claim 1 further comprising a plurality of forklift channels coupled to the base of the frame.

5. The mobile cart of claim 4 wherein the wheel base has a plurality of forklift openings that align with the plurality of forklift channels coupled to the base of the frame.

6. The mobile cart of claim 4 wherein the wheel housing has a plurality of forklift channels that align with the plurality of forklift channels coupled to the base of the frame.

7. The mobile cart of claim 1 wherein the wheel base comprises a plurality of elongated vertical openings, each adapted to receive at least one of a bolt and a wheel axel of the wheel housing.

8. The mobile cart of claim 1 wherein the wheel base comprises an elongated brake opening adapted to receive at least one of a bolt, a wheel axel, and a wheel brake of the wheel housing.

9. A mobile cart comprising:
a frame;
two retractable wheel base assemblies coupled to opposing sides of a base of the frame, wherein each retractable wheel base assembly comprises:
a wheel base having an elongated channel;
a wheel housing movably coupled to the wheel base within the channel; and
a plurality of wheels coupled in line within the wheel housing;
at least two deployment rods coupled to the base of the frame, each end of each deployment rod being positioned within one of the wheel bases;
a control rod coupled to the frame; and
a gear mechanism coupled along a length of each deployment rod,
wherein the control rod has a plurality of teeth that engage the gear mechanism of each deployment rod to move the deployment rods between a deployed position and a retracted position;
wherein each end of each deployment rod is rectangular in shape and has:
two opposing narrow surfaces; and
two opposing wide surfaces,
wherein each deployment rod is in a retracted position when the wide surfaces of each rectangular end are positioned flat against a top portion of the wheel housing and against a top portion of the wheel base; and
wherein each deployment rod is in a deployed position when the narrow surfaces of each rectangular end are positioned flat against the top portion of the wheel housing and against the top portion of the wheel base.

10. The mobile cart of claim 9 further comprising:
a handle coupled at one end of the control rod for manually moving the control rod; and
a lock for preventing movement of the handle.

11. The mobile cart of claim 9 further comprising two wheel brakes, each wheel brake coupled to one of the wheels within each wheel housing.

12. The mobile cart of claim 9 further comprising:
two large forklift channels coupled to the base of the frame and positioned between the two wheel base assemblies; and
two pairs of small forklift channels formed on opposing sides of the bottom of the base and positioned perpendicular to the large forklift channels.

13. The mobile cart of claim 12 wherein each wheel base has two forklift openings that align with the two large forklift channels coupled to the base of the frame.

14. The mobile cart of claim 12 wherein each wheel housing has two forklift channels that align with the two large forklift channels coupled to the base of the frame.

15. The mobile cart of claim 9 wherein each wheel housing comprises:
at least three wheels;
at least one brake coupled to one of the wheels;
at least three wheel axels wherein each wheel rotates about one wheel axel; and
a plurality of bolts securing each of the wheel axels to the wheel housing.

16. The mobile cart of claim 15 wherein each wheel base comprises:
two elongated vertical openings, each adapted to receive at least one of a bolt and a wheel axel of the wheel housing; and
at least one elongated brake opening adapted to receive at least one of a bolt, a wheel axel, and a wheel brake of the wheel housing.

* * * * *